United States Patent [19]

Boggs et al.

[11] 4,175,796
[45] Nov. 27, 1979

[54] TRACK-TYPE VEHICLE WHEEL CLEANING APPARATUS

[75] Inventors: Roger L. Boggs, East Peoria; Jon C. Christensen, Chillicothe, both of Ill.

[73] Assignee: Caterpillar Tractor Co., Peoria, Ill.

[21] Appl. No.: 909,760

[22] Filed: May 26, 1978

[51] Int. Cl.² .............................................. B62D 55/14
[52] U.S. Cl. .................... 305/11; 74/243 R; 305/57
[58] Field of Search ............. 305/11, 12, 57, 21; 74/243 R, 243 DR

[56] References Cited

U.S. PATENT DOCUMENTS

| | | |
|---|---|---|
| 1,607,940 | 11/1926 | Best. |
| 1,841,925 | 1/1932 | Woodbury ..................... 74/243 R |
| 3,899,219 | 8/1975 | Boggs. |
| 4,058,352 | 11/1977 | Sogge. |
| 4,080,008 | 3/1978 | Groff et al. ..................... 305/57 |
| 4,082,372 | 4/1978 | Kozuki ........................... 305/57 |

FOREIGN PATENT DOCUMENTS 900535  12/1953  Fed. Rep. of Germany ............. 305/57

*Primary Examiner*—John P. Shannon
*Attorney, Agent, or Firm*—William B. Heming

[57] ABSTRACT

A wheel has a hub and a rim connected to the hub. Teeth are positioned on the outer surface of the rim and arcuately spaced one from the other by a root area. The root areas have an outer periphery and define a root diameter. The wheel has an annular opening in communication with said outer periphery of the root areas. A hoop having an outside diameter greater than the root diameter is positioned in the annular opening for movement in response to operation of the wheel and cleaning of material from the root areas in response to the movement.

9 Claims, 6 Drawing Figures

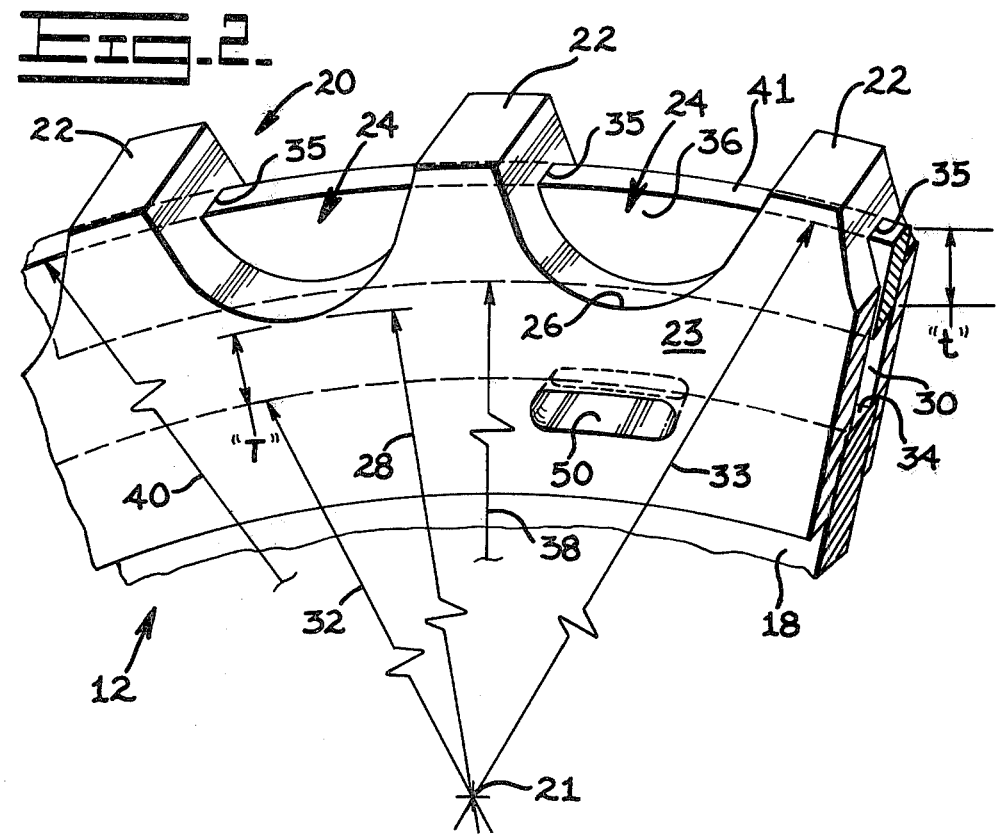
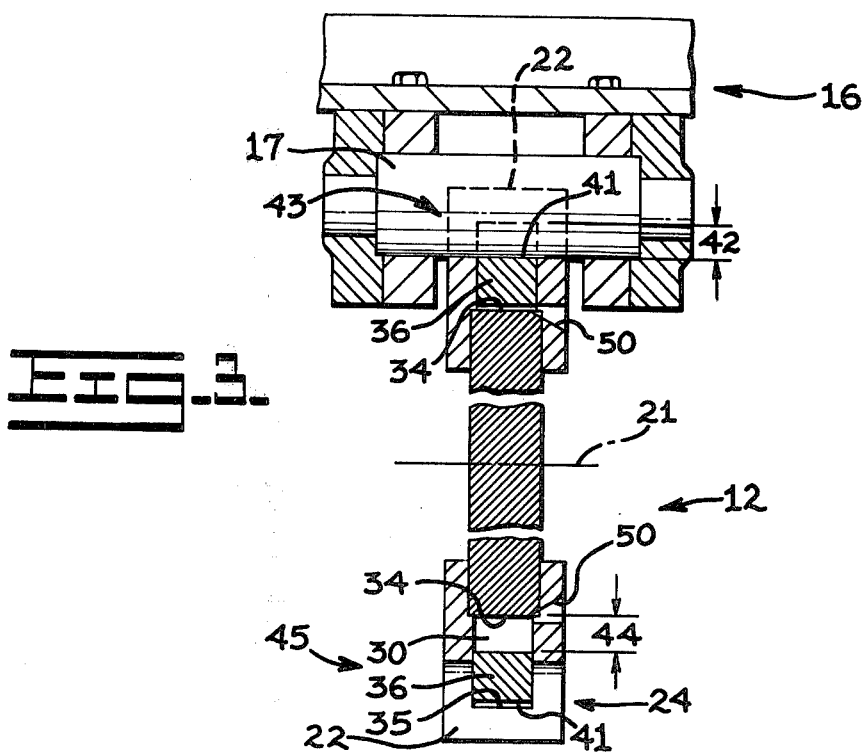

TRACK-TYPE VEHICLE WHEEL CLEANING APPARATUS

BACKGROUND OF THE INVENTION

In the use of wheels having teeth about their outer surfaces, it is desirable that the areas between the teeth be kept clean of material in order to prevent improper engagement of the wheel and its mateable component.

Wheels of this type are commonly used on track-type vehicles to drive a continuous track and propel the vehicle. A typical application is in an environment of wet or closely packed materials. As the wheel and track move, loose material tends to locate in the root areas between teeth on the wheel. In response to repeated engagement of tooth and track bushing, the material can remain and become tightly packed into the root areas. This can cause a mismatch of track and wheel.

Packing of the root areas changes the pitch of the track and forces the track bushings to ride up on the tip of the teeth. This can result in increased wear, reduced track life, and other damage to the drive train. Further, the track can eventually jump from the teeth. This represents a waste of time and labor. Therefore, it is desirable to provide a method of cleaning the root areas between the teeth during operation of the work vehicles.

SUMMARY OF THE INVENTION

According to the present invention, a wheel has a hub and a rim. The rim has an outer surface and is connected to the hub. Teeth are positioned about the outer surface of the rim. The teeth are arcuately spaced one from the other by a root area. The root areas have an outer periphery and define a root diameter. The wheel has an annular opening having an inner diameter less than the root diameter with said annular opening being in communication with the outer periphery of the root area. A hoop havng an outside diameter greater than the root diameter is positioned in the annular opening and moves in response to rotating the wheel and cleans material from the root areas in response to the hoop movement.

BRIEF DESCRIPTION OF THE DRAWINGS

FIG. 2 is a diagrammatic view showing the invention in greater detail;

FIG. 3 is a diagrammatic cross sectional view of FIG. 1 showing the invention and associated portions of the vehicle track in greater detail;

DETAILED DESCRIPTION

Figure 1:
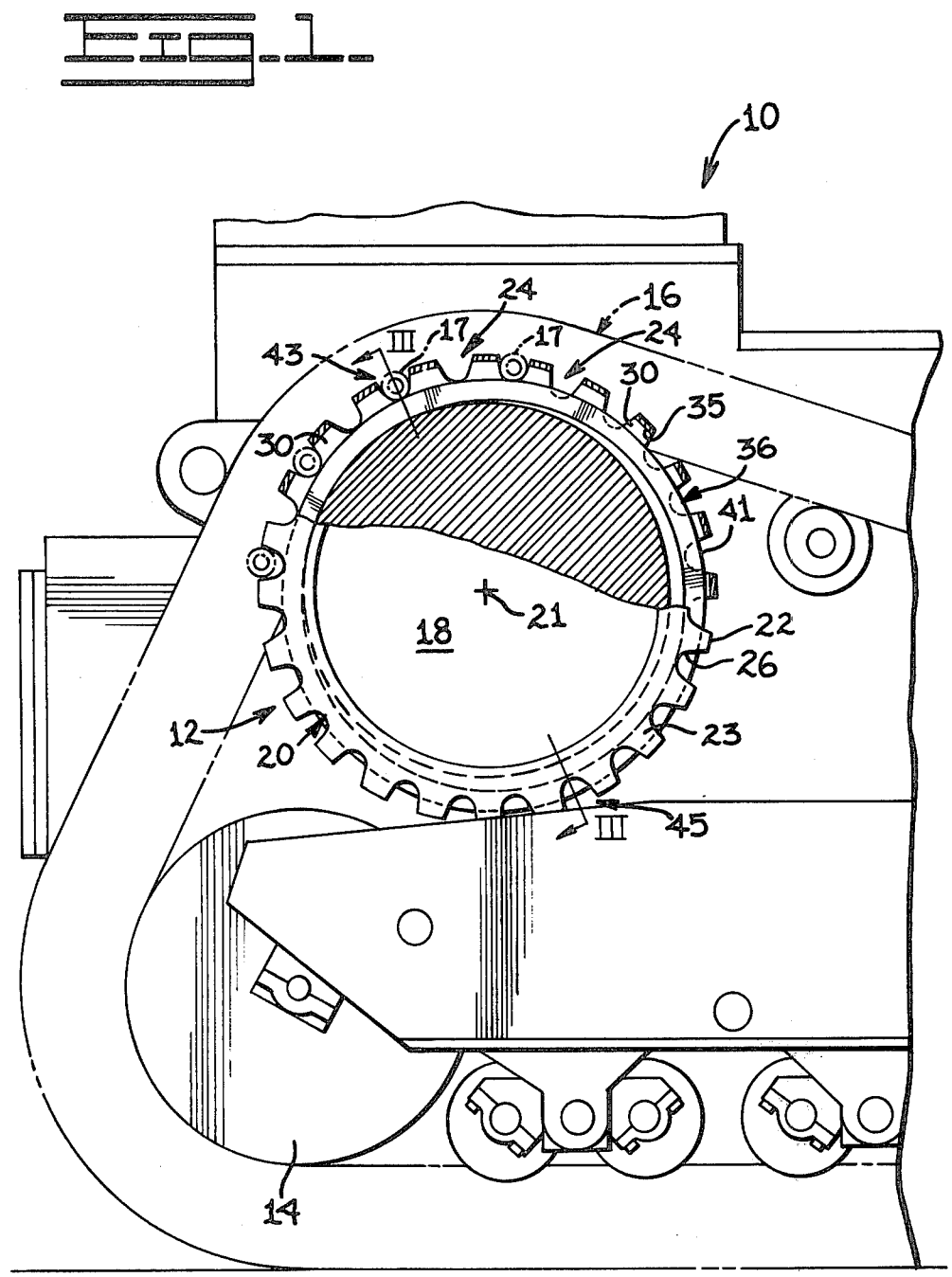
FIG. 1 is a diagrammatic view of the invention on the wheel of a track type vehicle.

Referring to FIG. 1, as is well known in the art, a track-type vehicle 10 has a drive wheel 12, idler 14, and a continuous track 16. The track has bushings 17. The wheel has a hub 18, rim 20, axis of rotation 21, and teeth 22. The wheel 12 is used to drive the continuous track 16 and propel the vehicle 10.

Figure 4:
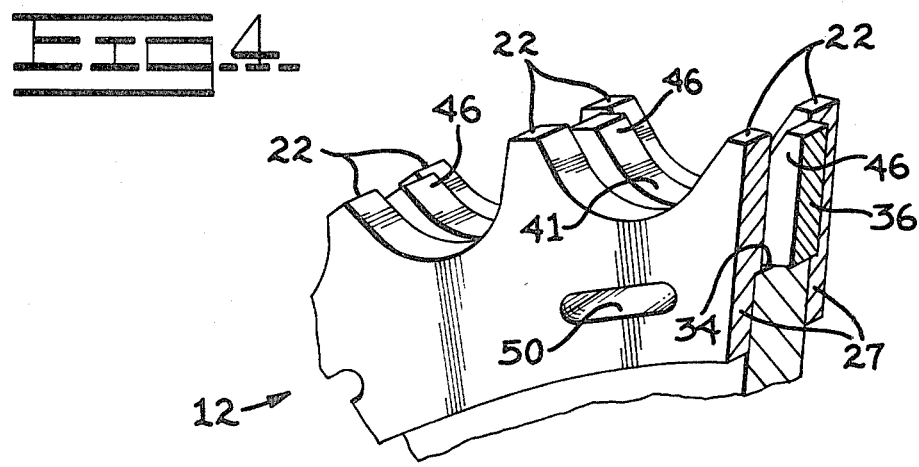
FIG. 4 is a diagrammatic view showing another embodiment of the invention.

Referring to FIGS. 1 and 2, the teeth 22 are positioned about the outer surface 23 of the rim 20 and are arcuately spaced one from the other by a root area 24. The root areas 24 have an outer periphery 26 and define a root diameter 28. The teeth 22 can be of other construction, such as being detachably connected to the rim 20 and positioned in substantially parallel spaced apart rows 27, as shown in FIG. 4.

As shown in FIG. 2, the wheel 12 has an annular opening 30 having inner and outer diameters 32, 33 and inner and outer surfaces 34, 35. The opening 30 is in communication with the outer periphery 26 of the root areas 24. A hoop 36 having inner and outer diameters 38, 40 is positioned in the annular opening 30. The hoop 36 has an outer surface 41. The outer diameter 40 of the hoop 36 is greater than the root diameter 28. Preferably, the root diameter 28 reduced by the annular opening inner diameter 32 is at least as great as the hoop outer diameter 40 reduced by the hoop inner diameter 38. In other words, thickness "T" is at least as great as thickness "t." By this construction, the contacted portion of the hoop outer surface 41 can be urged to a position at which said portion of the outer surface 41 of the hoop 36 is substantially flush with the outer periphery 26 of the root areas 24 during operation of the vehicle 10.

The hoop 36 can be of a construction sufficient for being forcibly urged a first displacement 42 at a first location 43 on said hoop 36 and being correspondingly urged a substantially similar second displacement 44 at a second opposed location 45 on said hoop 36. Therefore, referring to FIGS. 1 and 3, the hoop 36 is of a sufficiently rigid construction to be displaced to a location that is not concentric to the axis 21 in response to contact of the hoop 36 by the track 16.

Figure 5:
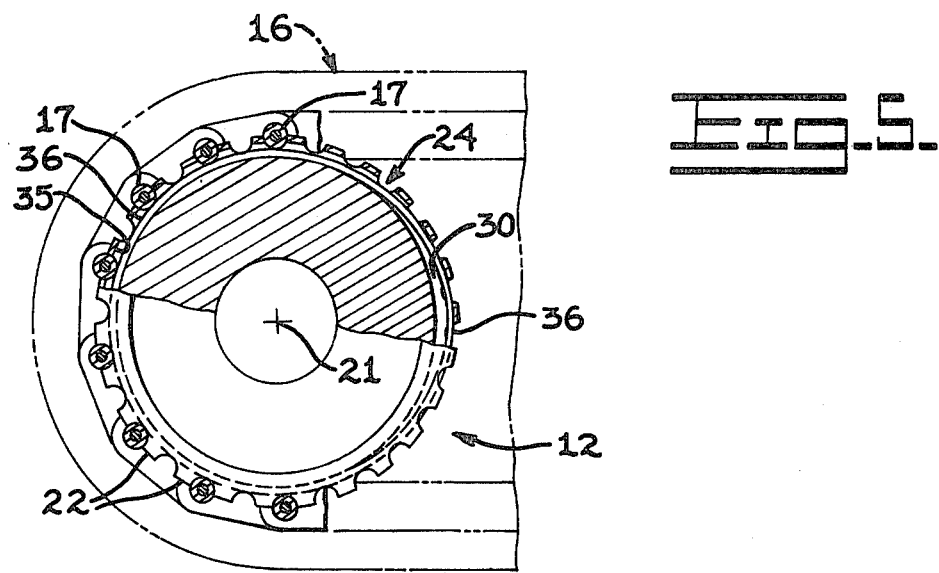
FIG. 5 is a diagrammatic view showing yet another embodiment of the invention.

Referring to FIG. 5, the hoop 36 can also be of a construction sufficient for forcibly urging against the annular opening outer surface 35 and being sufficiently flexible for being forcibly urged toward the axis 21 in response to contact by the track 16. Said hoop 36 is generally radially movable in the annular opening 30 adjacent the root area 24 at which the hoop 36 is contacted by the track 16. In this construction, the hoop 36 continuously urges against said outer surface 35 and is displaced from the root area 24 only during engagement between teeth 22 and respective track bushings 17.

Referring to FIG. 4, the hoop 36 can have teeth 46 positioned about its outer surface 41. It is desirable that said teeth 46 be of a number at least equal to the number of teeth 22 on the wheel 12. Hoop teeth 46 in excess of the number of wheel teeth 22 provides rotation or partial rotation of the hoop 36 relative to the wheel 12 during rotation of the wheel 12 and engagement of the track 16. This relative movement of the hoop 36 can also be provided by hoop teeth 46 being of a greater size than teeth 22 of the wheel 12.

It is desirable to provide relief openings 50 in the wheel 12 for passing material from the root areas 24, particularly that material located between the hoop 36 and wheel 12, to a location spaced from the wheel 12. Said relief openings 50 are in communication with the inner surface 34 of the annular opening 30 (FIGS. 3 and 4).

Figure 6:
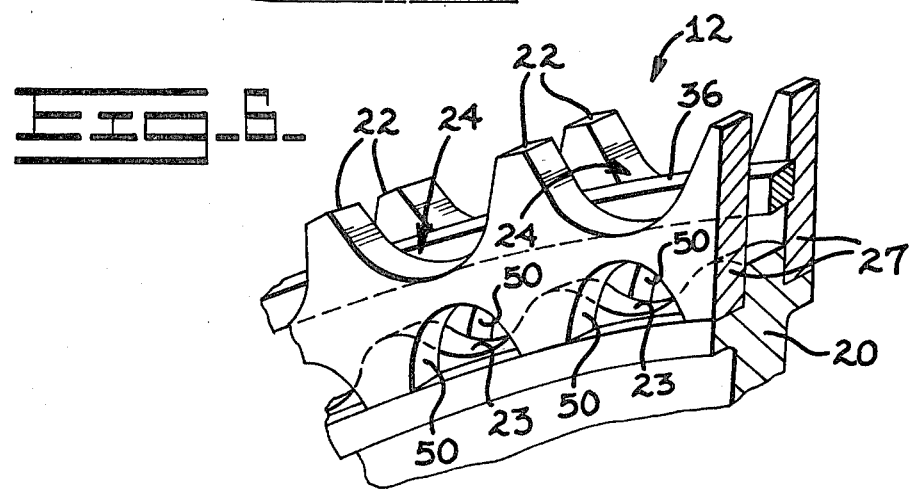
FIG. 6 is a diagrammatic view showing still another embodiment of the invention.

Referring to FIG. 6, in a wheel 12 with teeth 22 provided in spaced apart rows 27, said relief openings 50 can be adjacent each respective root area 24. Adjacent respective relief openings 50 in adjacent rows 27 are in communication one to the other and to the outer surface 23 of the rim 20. Said relief openings 50 are in communication with the side surfaces of the wheel 12 in order for said material to exhaust from the root areas 24.

The wheel 12 can also be a gear or other toothed member of a circular configuration without departing from this invention.

OPERATION

In the operation of the track-type vehicle wheel cleaning apparatus, the hoop 36 forcibly urges against material located in the root areas 24 of the wheel 12. This action displaces said material, removing it from the root areas 24 of the teeth 22. Therefore, the tendency of material to pack in the root areas 24 and increase track pitch is substantially overcome.

For example, in the track-type vehicle 10, the rotating drive wheel 12 engages the track 16 to drive the vehicle 10 (FIG. 1). As the track 16 and wheel 12 engage, the hoop 36 is forced into the annular opening 30 by the track 16. Opposite portions of the hoop 36 are correspondingly displaced in the annular opening 30. More particularly, the hoop 36 is displaced a predetermined distance in the annular opening 30. This distance is dependent upon the inner and outer diameters 32, 33, 38, 40 of the annular opening 30 and of the hoop 36.

Where present, relief openings 50 help clean mud or dirt from the root areas 24 which can sometimes locate between the hoop 36 and wheel 12. The hoop 36 is urged into the annular opening 38 during engagement. This action tends to force said material through the relief openings 50 and away from the root areas 24 (FIGS. 3 and 5).

In another embodiment, the hoop 36 continuously forcibly urges against the outer surface 35 of the annular opening 30. The hoop 36 is displaced into the annular opening 30 during track engagement. As the track 16 disengages, the hoop 36 tends to return to the normal position against said outer surface 35, thereby displacing material placed in the root area 24 during track engagement.

Other aspects, objects and advantages of this invention can be obtained from a study of the drawings, the disclosure and the appended claims.

The embodiments of the invention in which an exclusive property or privilege is claimed are defined as follows:

1. In a wheel having a hub, a rim having an outer surface and being connected to the hub, and teeth being positioned about the outer surface of the rim and being arcuately spaced one from the other by a root area, said root areas having an outer periphery and defining a root diameter, the improvement comprising:

said wheel having an annular opening having an inner diameter and an inner surface and being in communication with the outer periphery of the root areas, said inner diameter being less than the root diameter; and a hoop having inner and outer diameters and being positioned in the annular opening and free from connection with the wheel, said inner and outer diameters being greater than the inner diameter of said annular opening and the root diameter, respectively.

2. A wheel, as set forth in claim 1, wherein said teeth are positioned about said rim outer surface in substantially parallel, spaced apart rows.

3. A wheel, as set forth in claim 1, wherein said wheel includes relief openings in communication with said inner surface of the annular opening.

4. A wheel, as set forth in claim 2, wherein said wheel includes relief openings adjacent respective root areas in said spaced apart rows, and wherein said respective adjacent relief openings in adjacent, spaced apart rows are in communication one to the other and to the outer surface of the rim.

5. A wheel, as set forth in claim 2, wherein said hoop includes an outer surface and teeth positioned about said outer surface.

6. A wheel, as set forth in claim 5, wherein said hoop teeth are of a number at least equal to the number of teeth on the wheel.

7. A wheel, as set forth in claim 1, wherein said hoop is of a construction sufficient for being forcibly urged a first displacement at a first location on said hoop, said hoop being correspondingly urged a substantially similar second displacement at a second location on said hoop opposite said first location.

8. A wheel, as set forth in claim 1, wherein said annular opening has an outer surface and said hoop is of a construction sufficient for continuously forcibly urging against said annular opening outer surface and being forcibly urged at said outer periphery of the root areas, said hoop being generally radially movable within said annular opening adjacent respective root areas.

9. A wheel, as set forth in claim 1, wherein said root diameter reduced by said annular opening inner diameter is at least as great as said hoop outer diameter reduced by said hoop inner diameter.

* * * * *